Feb. 18, 1930.  V. CASTORINA  1,747,926
FISHING APPARATUS
Filed Oct. 10, 1928   3 Sheets-Sheet 1
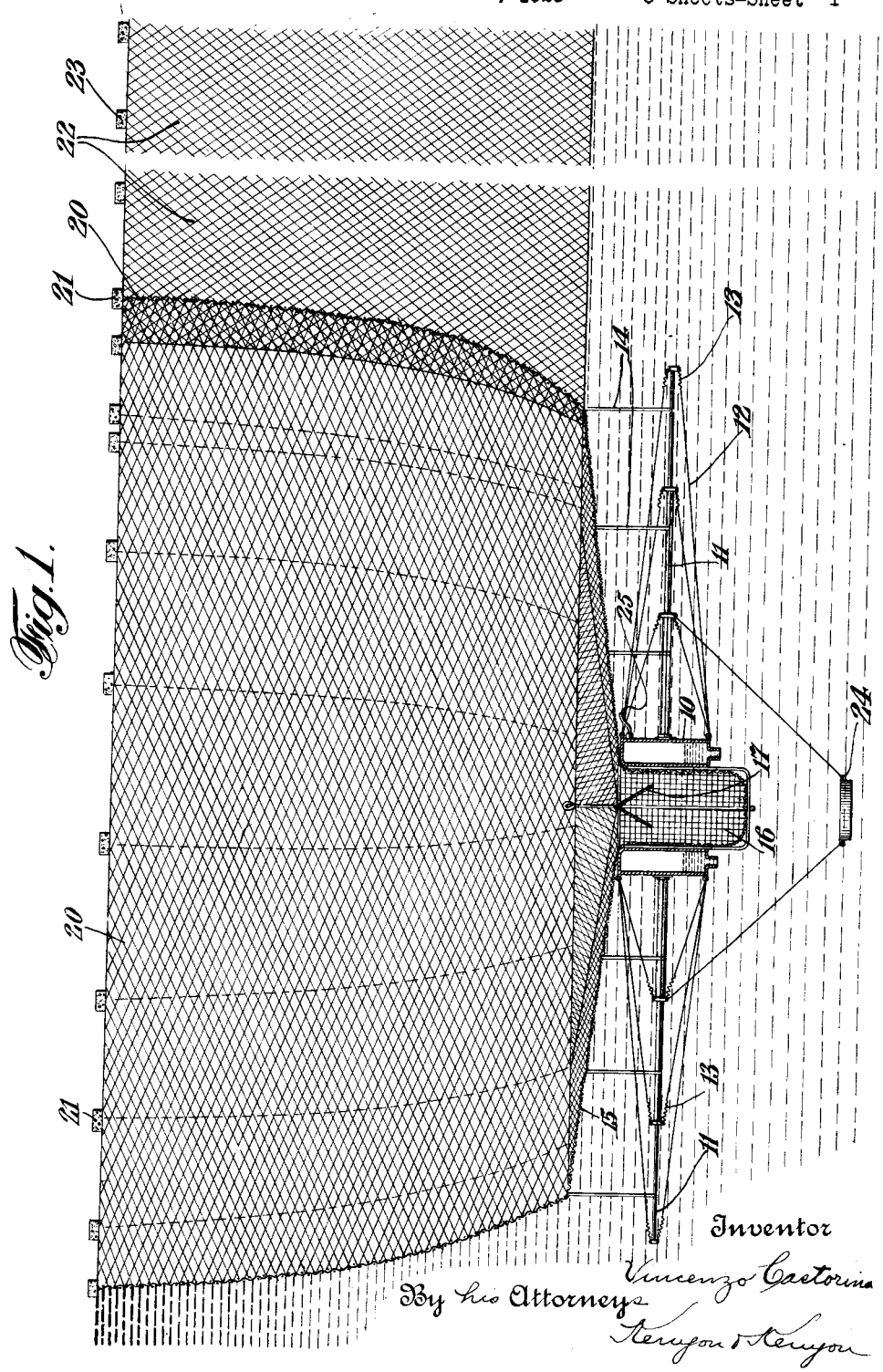

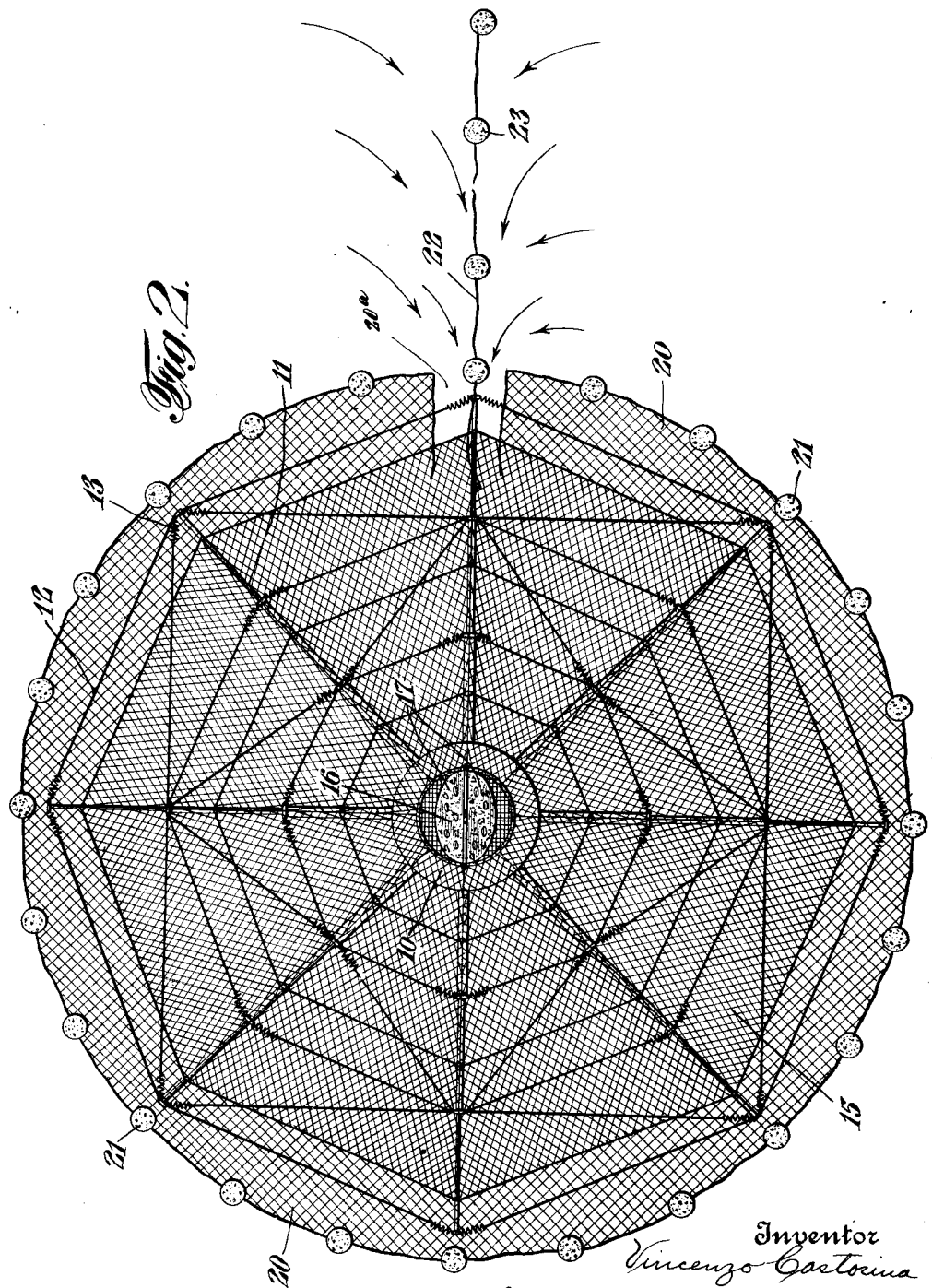

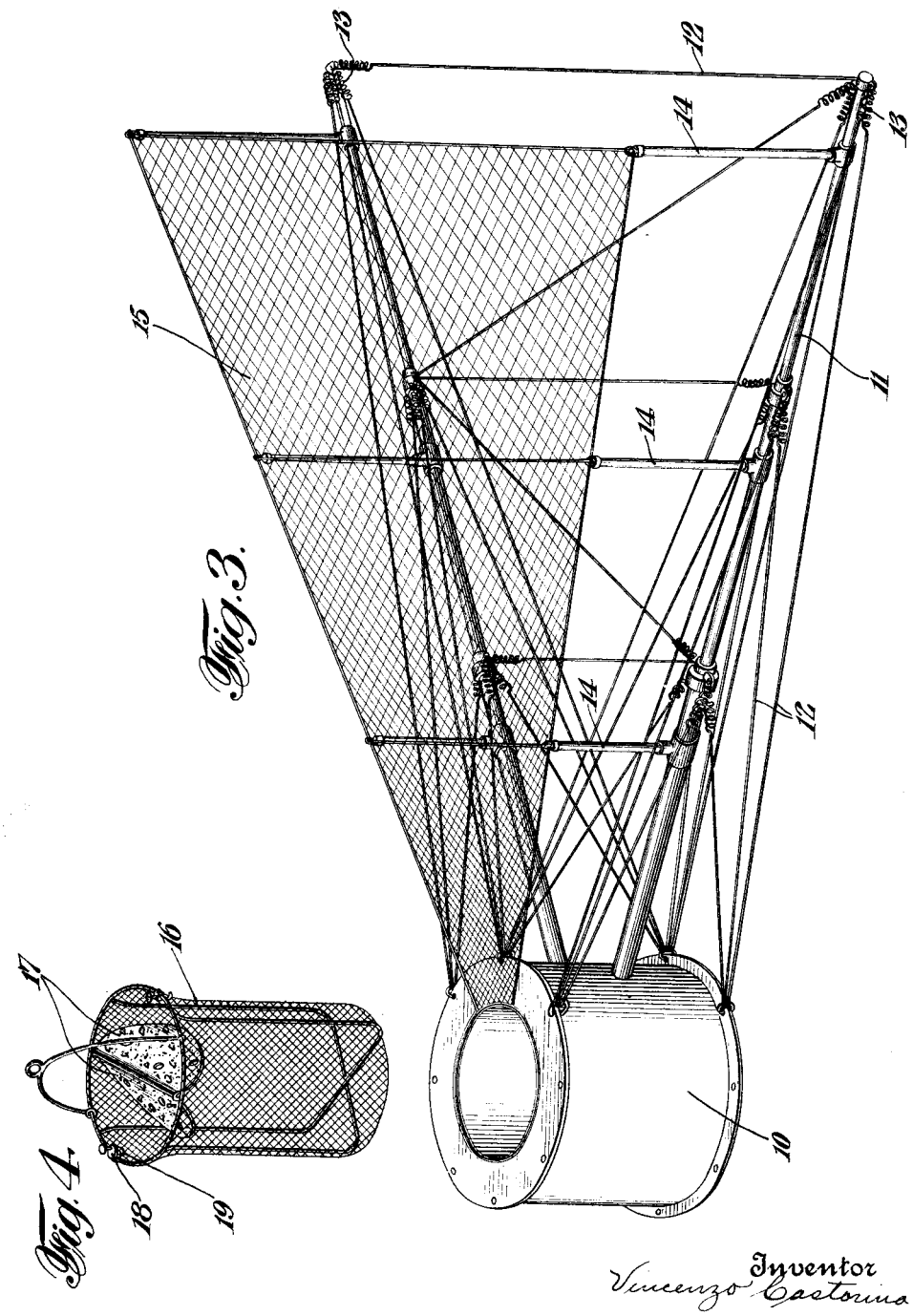

Patented Feb. 18, 1930

1,747,926

UNITED STATES PATENT OFFICE

VINCENZO CASTORINA, OF WEST NEW YORK, NEW JERSEY

FISHING APPARATUS

Application filed October 10, 1928. Serial No. 311,432.

This invention relates to fishing apparatus and has for an object an improved, efficient and easily operable fishing net.

The apparatus comprises essentially an annular air chamber from which projects radially arranged arms suitably interconnected with cables to form a supporting structure. A net sloping downwardly toward the centre of the structure is supported by posts carried by the supporting structure. This apparatus is caused to sink below the surface of a body of water by removing the air from the air chamber and permitting water to flow thereinto. A basket is removably supported within the circular space defined by the annular chamber and is adapted to receive the fish entrapped by the device. A cylindrical net has its bottom edge attached to the periphery of the first mentioned net and is supported vertically by floats attached to the top edge of the nets, thus forming a pound.

In operation the device is caused to sink and is left in such position for a while, thus allowing the entrance of fish into the pound. Air is then forced into the air chamber to restore the buoyancy and cause the apparatus to rise to the surface. The fish entrapped in the pound are directed by the sloping bottom net into the removable basket which is provided with a self closing cover. After the apparatus has reached the surface the basket is removed, emptied and either it or a similar basket placed in the apparatus after which the operation is repeated.

Other objects, novel features and advantages of this invention will be apparent from the following specification and accompanying drawings wherein:

Fig. 1 is a sectional view of an apparatus embodying the invention in submerged position;

Fig. 2 is a plan view of the same;

Fig. 3 is a perspective view of one section of the supporting structure and

Fig. 4 is a perspective view of the basket.

In the embodiment of the invention disclosed herein 10 is an annular casing from which are supported radially projecting arms 11. These arms are braced from each other and from the casing 10 by means of cables 12 each formed with a helical resilient portion 13 at one end whereby the frame is slightly flexible although sufficiently rigid to withstand normal conditions. Each arm is provided with a plurality of vertical posts 14 which are of increasing height outwardly. From the upper end of the posts 14 is supported a substantially circular net 15 the periphery of which is at a higher elevation than the central portion. The central portion of the net 15 is provided with an aperture the edge of which coincides with the inner periphery of the casing 10 to which the net is attached.

A basket 16 formed of reticulate material is supported in the cylindrical space of the casing 10, the upper rim of the basket resting upon the top face of said casing. This basket is provided with two buoyant semi-circular lids 17 pivotally mounted on a pintle extending diametrically across the top of the basket. The lids 17 are formed of wood, cork or other material of lighter specific gravity than water. These lids are permitted to swing downwardly into the basket by gravity and their upward movement is limited by stops 18 in which are mounted latches 19 by means of which the lids may be held in elevated position in contact with the stops 18. When this basket is lowered into the water the lids rise by their own buoyancy from the position shown in Fig. 4 into contact with the stops 18. They will yield however to permit a fish to enter the net but will then swing back to place and prevent the escape of the fish. Before the basket is removed from the water the latches 19 are arranged beneath the lids to prevent the same from dropping as the basket is lifted out of the water.

A second net 20 is supported at its upper edge by floats 21 and is attached at its lower edge to the periphery of the net 15. This net is not circumferentially complete but is open at one place to provide an entrance 20$^a$ into the pound formed by the nets 15 and 20. A guide net 22 supported by the floats 23 serves to direct fish through the aforementioned entrance into the pound. A ballast ring 24 is supported from the arms 11.

In operation, the apparatus is arranged as shown in Fig. 1, the buoyancy of the casing 10 being sufficiently decreased by the introduction of water thereinto to permit the frame to assume the position shown. When it is desired to remove the catch of fish from the apparatus, air is pumped into the casing 10 through the hose 25, connected to a pump (not shown) carried by a boat or the like, until the buoyancy of the casing causes the entire structure to rise to the surface of the water. The fish entrapped within the pound find their way, by reason of the funnel shape of the net 15 into the basket 16. The lids 17 permit the fish to enter the basket but prevent their escape therefrom. When the apparatus reaches the surface the lids 17 are latched and the basket 16 with the fish contained therein is removed and another basket substituted after which the apparatus is again submerged and the operation repeated.

As the various parts are interconnected by bracing cables having a certain amount of resiliency the entire device is somewhat flexible, thus enabling it to resist the pressure of the water. This neutralizes the effects of the waves and reduces the amount of material needed to construct the same.

I claim:—

1. A fishing apparatus comprising an annular casing constituting an air chamber, a funnel-shaped net supported from said casing and discharging into the cylindrical space defined by the casing, and a second net cooperating with said first net to define a fish pound.

2. A fishing apparatus comprising an annular casing constituting an air chamber, a funnel-shaped net supported by said casing and discharging into the cylindrical space defined by said casing, a cylindrical basket removably supported by said casing within said space, and buoyant lids for said basket pivotally supported thereby.

3. A fishing apparatus comprising an annular casing constituting an air chamber, a funnel-shaped net supported by said casing and discharging into the cylindrical space defined by said casing, a cylindrical basket removably supported by said casing within said space, buoyant lids for said basket pivotally supported thereby and a second net cooperating with said first net to define a fish pound.

4. A fishing apparatus comprising an annular casing constituting an air chamber, arms projecting radially from said casing, vertical posts extending upwardly from said arms and being of increasing height outwardly from the casing, a net supported by said posts and discharging into the cylindrical space defined by said casing, a basket removably supported by said casing in said space, and a bouyant closure for said basket.

5. A fishing apparatus comprising an annular casing constituting an air chamber, arms projecting radially from said casing, vertical posts extending upwardly from said arms, and being of increasing height outwardly from the casing, a net supported by said posts and discharging into the cylindrical space defined by said casing, a basket removably supported by said casing in said space, a buoyant closure for said basket and a second net cooperating with said first net to define a fish pound.

6. A fishing apparatus comprising an annular casing constituting an air chamber, arms projecting radially from said casing, bracing cables extending between said arms and from said casing to said arms, said cables having resilient sections, vertical posts extending upwardly from said arms and being of increasing height outwardly of the casing, a net supported by said posts and discharging into the cylindrical space defined by said casing, a basket removably supported by said casing in said space and a buoyant closure for said basket.

7. A fishing apparatus comprising an annular casing constituting an air chamber, arms projecting radially from said casing, bracing cables extending between said arms and from said casing to said arms, said cables having resilient sections, vertical posts extending upwardly from said arms and being of increasing height outwardly of the casing, a net supported by said posts and discharging into the cylindrical space defined by said casing, a basket removably supported by said casing in said space, a buoyant closure for said basket and a second net cooperating with said first net to define a fishing pound.

In testimony whereof, I have signed my name to this specification.

VINCENZO CASTORINA.